Dec. 6, 1955  T. BROWN  2,725,810
HITCH DEVICE
Filed March 10, 1951  2 Sheets-Sheet 1
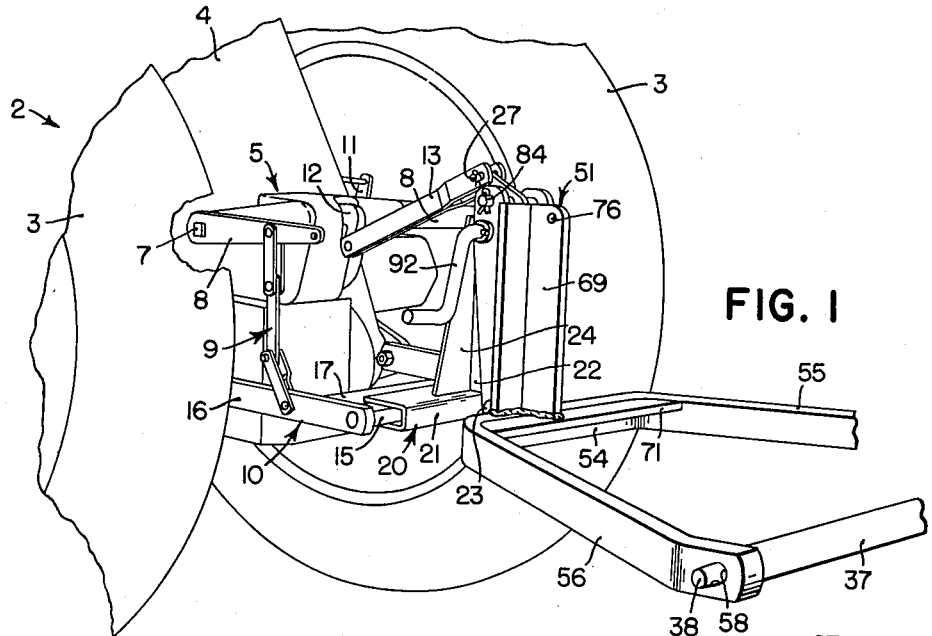
FIG. 1
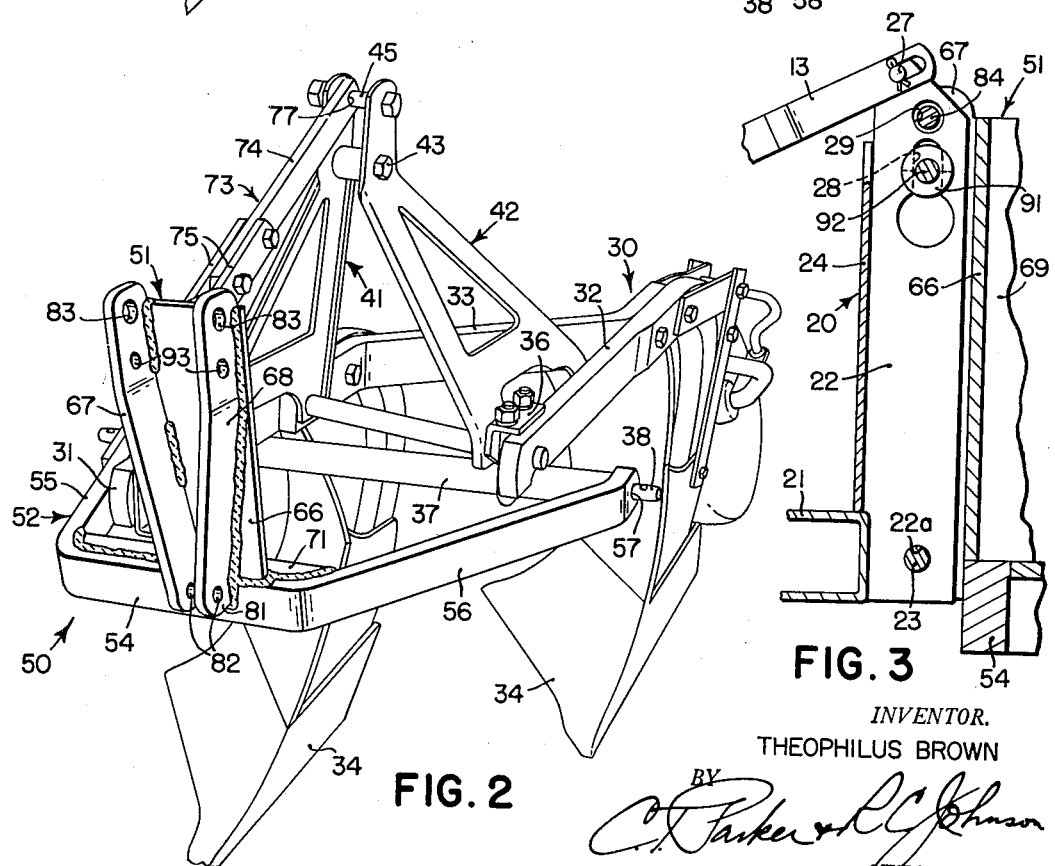
FIG. 2
FIG. 3
INVENTOR.
THEOPHILUS BROWN
BY
C. T. Parker & L. C. Johnson
ATTORNEYS

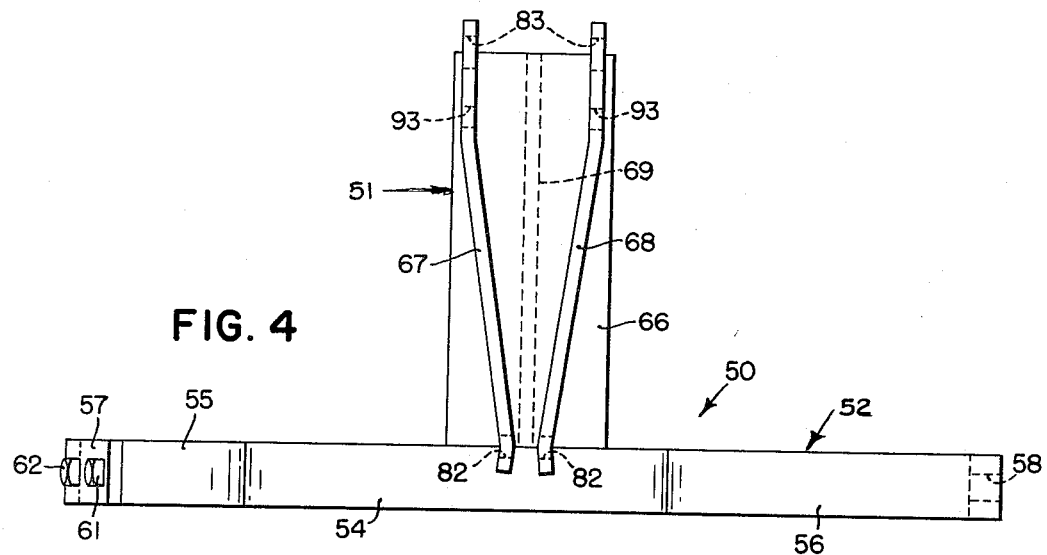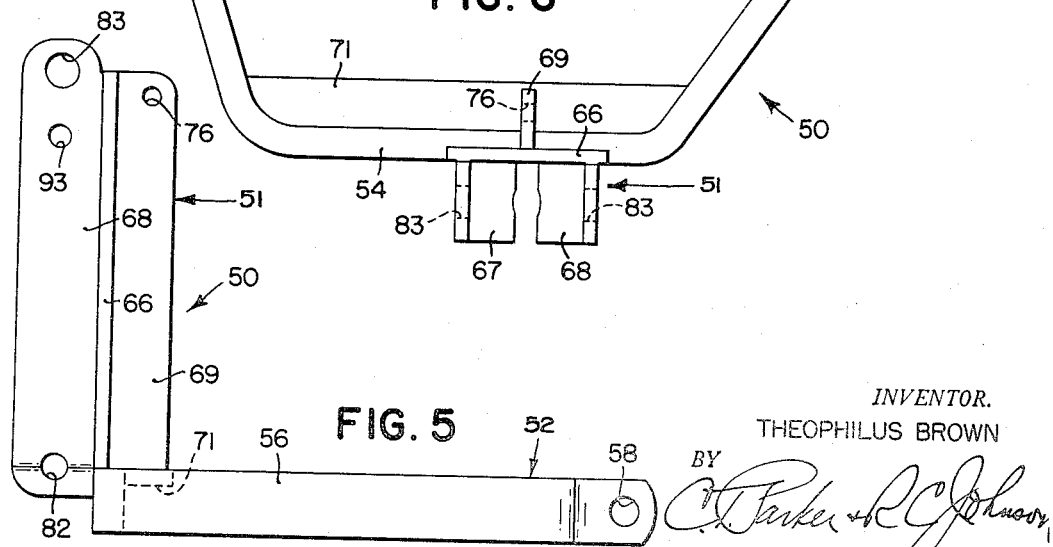

United States Patent Office 2,725,810
Patented Dec. 6, 1955

2,725,810

HITCH DEVICE

Theophilus Brown, Moline, Ill., assignor to Deere & Company, Moline, Ill., a corporation of Illinois Application March 10, 1951, Serial No. 214,877

6 Claims. (Cl. 97—47.14)

The present invention relates generally to implement hitches by which an implement, such as a plow or the like, may be connected to a farm tractor so as to be raised, lowered, and controlled, as well as drawn, by the tractor.

The object and general nature of the present invention is the provision of a new and improved hitch device which includes a draft bracket in the nature of an adapter particularly constructed and arranged to connect an integral or tractor-carried type of implement, having an upper connector and two lower laterally spaced apart, outwardly extending studs with a tractor of the type having only two connecting points, the lower one of which may be the vertically swingable drawbar of the tractor and the other or upper a tractor-controlled, generally vertically swingable depth-adjusting link. By virtue of the present invention, an implement of the type mentioned above may readily be connected to farm tractors which do not have an upper compression link and two laterally spaced, rearwardly extending tension links, such as are employed in the so-called Ferguson system, one form of which is disclosed in the Ferguson Patent 2,223,002, issued November 26, 1940.

These and other objects and advantages of the present invention will be apparent to those skilled in the art after a consideration of the following detailed description, taken in conjunction with the accompanying drawings, in which:

Figure 1 is a perspective view of the rear portion of a tractor, together with the hitch device of the present invention mounted in operative relation thereon.

Figure 2 is a perspective view, showing the hitch unit of the present invention as attached to a two-bottom plow of the type which is normally hitched to a tractor incorporating the Ferguson linkage.

Figure 3 is a fragmentary detail view of the lateral tilt adjustment.

Figures 4, 5 and 6 are front, side and plan views of the hitch adapter which forms the principal part of the present invention.

Referring first to Figures 1 and 2, the present invention is shown as incorporated in a tractor and plow combination, both the tractor per se and the plow per se being old and well known, so far as the present invention is concerned. The tractor, which is indicated in its entirety by the reference numeral 2, includes front wheel means (not shown), rear wheel means 3 driven by a power plant 4 of any suitable construction, which also energizes a power-actuated mechanism 5 of the type generally referred to as a power lift. The mechanism 5 includes a transversely disposed rockshaft 7 carrying power lift arms 8 fixedly connected at the ends of the rockshaft 7, the outer ends of the power lift arms 8 being connected by lost-motion or normally slack link means 9 with the drawbar 10 of the tractor. The drawbar 10 of the tractor is connected for generally vertical swinging movement about a transverse axis relative to the tractor, and the power lift unit 5 is constructed substantially the same as that shown in U. S. Patent 2,477,710, issued August 2, 1949, to Charles C. Worstell, to which reference may be made if necessary. By means disclosed and claimed in the patent just mentioned, the power lift rockshaft 7 may be rocked progressively in controlled increments in the raising direction by operating a control arm 11 in the desired amount and direction, the rockshaft 7 then moving a corresponding amount in that direction. Specifically, the parts are so arranged that when the control arm 11 is moved to raise the power lift arms 8 from the position shown in Figure 1, the first portion of rotation of the rockshaft 7 does not raise the drawbar 10. It does, however, swing a depth controlling arm 12, which is fixed to the generally central portion of the rockshaft 7, the lower end of the arm 12 moving generally rearwardly. A depth controlling link 13 is pivotally connected at its forward end to the depth control arm 12. However, after the slack in the link means 9 has been taken up, the tractor drawbar 10 is raised.

The tractor drawbar 10 is provided with a rear transverse member 15, the ends of which are pivotally supported in the side bars 16 forming a part of the drawbar 10. The side bars 16 are rigidly interconnected by a crossbar 17, the ends of which are securely fixed, as by welding, to the side arms 16. The tractor drawbar 10 is adapted to receive and support a generally vertically disposed frame structure 20. This includes a transversely disposed, generally U-shaped socket member 21, open at its forward side so as to receive the drawbar member 15, and an upwardly extending plate section 22, which is disposed in a vertical fore-and-aft extending plane and welded at its lower end to the socket member 21. The lower end of the vertical plate 22 is apertured, as at 22a, to receive a hitch pin 23, by which an implement attaching structure may be connected thereto, and the vertical plate 22 is reenforced by a pair of lateral gussets 24. The vertical plate section 22 extends upwardly and is apertured to receive a pin 27 by which the rear end of the depth control link 13 is connected therewith. Below the pivot member 27, the upper portion of the vertical plate 22 is provided with a keyhole slot 28 which will be referred to later. Between the keyhole slot 28 and the pivot 27 the upper portion of the vertical plate section 22 is provided with a pin-receiving aperture 29, the lower aperture 22a and the upper aperture 29 in the plate section 22 forming vertically spaced apart points at which an implement may be connected to the drawbar and depth-control link of the tractor 2.

As best shown in Figure 2, the plow, the details of which per se are conventional, so far as the present invention is concerned, is indicated in its entirety by the reference numeral 30 and includes a pair of plow beams 31 and 32 connected together by suitable bracing 33 and carrying plow bottoms 34 of any suitable construction.

The forward portions of the plow beams 31 and 32 are connected by suitable clamping means 36 to a transverse hitch bar 37, the ends of which are reduced to form laterally outwardly extending and laterally spaced apart studs 38. Also secured to the beams 31 and 32 by any suitable means is a pair of upwardly converging struts 41 and 42, the upper portions of which are rigidly secured together by a clamping bolt 43, the uppermost portions of the struts extending upwardly in parallelism and apertured to receive a connector 45, the two laterally spaced lower studs 38 and the upwardly disposed connector 45 forming points at which the upper and lower links of the conventional Ferguson system may be connected.

According to the principles of the present invention, I provide new and improved means by which a plow, of the type just described, and normally adapted to be connected through three non-parallel links with a propelling tractor, may be connected to a tractor having two vertically spaced attaching points which preferably are carried by a connecting linkage in the form of a lower, vertically swingable tractor drawbar and an upper, depth control link, such as the parts 10 and 13 described above. Such new and improved hitch adapter will now be described.

As best shown in Figures 2–6, the hitch adapter of the present invention, which is indicated in its entirety by the reference numeral 50, comprises a forwardly disposed, upwardly extending part 51 and a lower, horizontally disposed U-shaped member 52 having its central section 54 rigidly secured, as by welding, to the lower end of the forwardly disposed vertical part 51. The U-shaped member 52 includes rearwardly diverging arms 55 and 56. The rear end of the arm 56 is apertured, as at 58, to receive the associated, laterally outwardly extending implement-carried stud 38. The rear portion of the right-hand arm 55 is similarly apertured, except that, in the case of the arm 55, the apertured portion thereof is in the form of a detachable part 57, apertured at its rear end, as at 58, and also apertured to receive two bolts 61 and 62 which form means detachably connecting the part 57 with the arm 55. Thus, the hitch adapter 50 may readily be connected to an implement, such as the plow 30, by detaching the part 57, applying the left-hand arm 56 over the left-hand stud 38, inserting the right-hand stud 38 of the implement into the aperture 58, and then rigidly connecting the part 57 to the arm 55 by inserting the bolts 61 and 62 and tightening the same.

The forwardly disposed, upwardly extending part 51 comprises a flat plate section 66 welded to the central portion 54 of the U-shaped member 52, a pair of vertically disposed, forwardly extending bars 67 and 68, the rear edges of which are welded to the plate section 66, and a rear, vertically extending bar 69, the forward edge of which is welded to the rear face of the plate section 66 and the lower end of which is welded to the central section 54 of the U-shaped member 52 and to a reenforcing crossbar 71 which is also welded to the U-shaped member. A link 73, which may be formed of adjustable sections 74 and 75, is connected by a suitable pivot to the upper end of the rear vertical bar 69, the upper end of the bar 69 being apertured, as at 76, to receive said pivot. The rear portion of the link 73 is apertured, as at 77, to receive the implement-carried connector 45. When the link 73 is connected between the vertical strut section 51 and the upper ends of the implement struts 41 and 42, as shown in Figure 2, the implement 30 is held rigidly against movement relative to the hitch adapter 50. Any other suitable means for holding the implement rigid relative to the hitch adapter may be used, if desired.

The hitch adapter 50 may be connected by any suitable means with the tractor-carried linkage at the vertically spaced points 22a and 29. As mentioned above, the lower connection is made through a simple hitch pin 23. To this end, the lower portions of the upwardly diverging bars 67 and 68 are apertured, as at 82, the apertures 82 and/or the aperture 22a being so formed relative to the hitch pin 23 that there is sufficient looseness to accommodate a certain amount of lateral tilting of the hitch adapter 50 relative to the tractor-carried linkage structure. The uppermost ends of the bars 67 and 68 are apertured, as at 83, to receive a cross pin 84 (Figures 1 and 3) which is slidably disposed in the upper opening 29 in the tractor-carried vertical bar 22. To control the lateral tilting of the hitch adapter relative to the tractor, a nut member 91, internally threaded, is disposed and held against lateral movement in the upper portion of the keyhole slot 28, the nut member receiving the threaded portion of an adjusting crank 92, which is disposed in a pair of openings 93 formed in the upper portions of the hitch adapter bars 67 and 68, the crank screw 92 being held against lateral displacement in the openings 93 by any suitable means. The upper portion of the plate section 22, together with the crank screw 92 and associated parts, serves as means connected with the upper end portion of the upwardly extending part or strut 51 for receiving the rear portion of the depth controlling link 13.

Depth of the plow is controlled through the control arm 11 which regulates the rotational movement of rockshaft 7 and the depth controlling arm 12. As previously explained the first portion of rotation of the rockshaft as shown in Fig. 1 does not raise the drawbar but only takes up slack in the linkage to the drawbar. During this initial movement, however, the depth controlling link 13, being pivotally connected to the arm 12, is shifted generally rearwardly and this movement is transmitted to the upwardly extending part 51 of the hitch adapter 50. The hitch adapter 50 being a rigid member and rigidly connected to a vertically disposed frame structure 20 is rocked or tipped generally rearwardly, and this results in elevating the points of the plow bottoms 34, causing the plows to move upwardly to a position of lesser depth. As previously stated the implement 30 is held rigidly against movement relative to the hitch adapter 50. Thus longitudinal movement of the link 13 causes an adjustment in the depth of plowing. After the slack in the linkage 9 is taken up the drawbar will be raised by further rocking of the control arm 11, but this is an implement raising action and is not primarily a depth-adjustment action.

By virtue of the hitch adapter described above, I am able to connect an implement, such as the plow 30, which normally is adapted to be connected to a tractor by three links, to a tractor which has provision for connecting an implement to two vertically spaced points, the implement being held against lateral tilting relative to the tractor by a connection with the tractor drawbar and controlled, so far as depth adjustment is concerned, by the tractor-operated, depth control link which forms the upper part of the tractor-carried linkage.

While I have shown and described above the preferred structure in which the principles of the present invention have been incorporated, it is to be understood that my invention is not to be limited to the particular means, shown and described above, but that, in fact, widely different means may be employed in the practice of the broader aspects of my invention.

What I claim, therefore, and desire to secure by Letters Patent is:

1. For use with a tractor having a lower vertically swingable, laterally rigid drawbar and an upper connecting link, the latter and said drawbar providing two generally vertically spaced apart points of attachment to receive implements, the improvement comprising means for connecting to said vertically spaced points an implement having an upper connector and two lower laterally spaced apart, outwardly extending studs, said connecting means comprising a generally vertically disposed frame structure attachable at its upper portion to said link and having a rigid forwardly facing, laterally extending socket member adapted to receive the tractor drawbar, a hitch adapter having a forwardly disposed upwardly extending part and a lower, generally U-shaped member fixed at its central portion to said part in rigid laterally extending relation and including a pair of rearwardly extending, laterally spaced apart sections, the rear ends of said sections being apertured to receive said studs, upper and lower means on said frame structure and said socket member, respectively, to connect said frame structure with the upper connecting link and the lower drawbar of the tractor, means to connect said upper connection with the upper portion of said part, and means connected between the upper and lower portions of said frame structure and the upper and lower portions of the upwardly extending hitch adapter, respectively, for connecting the hitch adapter for lateral swinging movement relative to said frame structure.

2. For use with a tractor having a generally vertically swingable, laterally rigid drawbar and an upper depth-control link, the improvement comprising means for connecting to said drawbar and link an agricultural implement having an upper connector and two lower, laterally spaced apart, outwardly extending studs, said connecting means comprising a frame structure including a vertical section and a laterally extending member rigidly interconnected, said member being adapted to receive said tractor drawbar and the upper end of said vertical section being adapted to receive the rear end of said depth-control link, means to connect said laterally extending member with the tractor drawbar in draft transmitting relation, means to connect the upper portion of said vertical section to said depth-control link, a hitch adapter having a forwardly disposed, upwardly extending strut and a lower, generally U-shaped member having a central section fixed to the lower end of said strut and a pair of laterally spaced apart, rearwardly extending sections having apertured portions at their rear ends spaced to receive said studs, a link for connecting the upper connector of said implement with said hitch adapter, means to connect the upper end portion of said strut with upper portion of said vertical section, means to connect the lower portion of said strut with said laterally extending member, said two connecting means providing for lateral rocking of said strut relative to said vertical section, and means to tilt said hitch adapter laterally relative to said frame structure.

3. For use with a tractor having a generally vertically swingable drawbar and an upper depth-control link, the improvement comprising means for connecting to said drawbar and link an agricultural implement having an upper connector and two lower, laterally spaced apart, outwardly extending studs, said connecting means comprising a vertically disposed frame structure, means at the upper end of said frame structure to connect the rear portion of said depth-control link thereto, means at the lower portion of said frame structure to connect said tractor drawbar thereto, and a hitch adapter having a forwardly disposed, upwardly extending strut and a lower, generally U-shaped member having a central section fixed to the lower end of said strut and a pair of laterally spaced apart, rearwardly extending sections having apertured portions at their rear ends spaced to receive said studs, a link for connecting the upper connector of said implement with said hitch adapter, means to connect the upper portion of said strut with the upper portion of said frame structure, and means for connecting the lower portion of said hitch adapter with the lower portion of said frame structure.

4. Connecting means as set forth in claim 3, further characterized by the lower portion of said frame structure carrying a socket member adapted to receive the tractor drawbar, and the means connecting the upper end of said hitch adapter strut with the upper portion of said frame structure including means providing for lateral adjustment of the upper end of said strut relative to said frame structure.

5. The invention set forth in claim 3, further characterized by the means for connecting the lower portion of the hitch adapter with the frame structure comprising means providing for lateral tilting of said hitch adapter relative to said frame structure about a generally fore-and-aft extending axis.

6. For use with a tractor having two vertically spaced apart points of attachment to receive implements, the improvement comprising means for connecting said spaced apart points to an implement having an upper connector and two lower laterally spaced apart outwardly extending studs, said connecting means comprising a vertical frame structure, means connecting the upper and lower portions of said frame structure to the tractor at said vertically spaced apart points, a hitch adapter having a forwardly disposed vertically extending part and two rearwardly extending laterally spaced sections, the forward portion of said sections being fixed to said vertically extending part, means on the rear of said sections to receive said studs, means to pivotally connect the lower portion of said part with the lower portion of said vertical frame structure for movement relative thereto about a generally fore and aft extending axis, means to connect the upper portion of said vertically extending part with the upper connector of the implement, and means on the upper portion of the vertically extending part to connect the latter with the upper portion of said vertical frame structure, said last mentioned means including means to shift the hitch adapter laterally relative to at least one of said two spaced apart points of attachment.

References Cited in the file of this patent
UNITED STATES PATENTS

| | | |
|---|---|---|
| Re. 22,627 | McKay | Apr. 3, 1945 |
| 2,320,141 | Kott | May 25, 1943 |
| 2,322,342 | Bunn | June 22, 1943 |
| 2,341,807 | Olmstead | Feb. 15, 1944 |
| 2,347,898 | Ferguson | May 2, 1944 |
| 2,394,210 | Sherman | Feb. 5, 1946 |
| 2,521,503 | Clark | Sept. 5, 1950 |
| 2,531,768 | Cline et al. | Nov. 28, 1950 |
| 2,561,032 | Onfrey | July 17, 1951 |
| 2,575,622 | Fraga | Nov. 20, 1951 |